(12) United States Patent
Orange et al.

(10) Patent No.: US 11,498,249 B2
(45) Date of Patent: Nov. 15, 2022

(54) PROCESS FOR MANUFACTURING COMPOSITE ARTICLES

(71) Applicants: Rhodia Operations, Aubervilliers (FR); GEORGES PERNOUD SAS, Oyonnax (FR); BILLION SAS, Bellignat (FR)

(72) Inventors: Gilles Orange, Vourles (FR); Fabien Pascal, Saint-Priest (FR); Patrice Jacquet, Clairvaux-les-Lacs (FR); Alexandre Giroud, Priay (FR)

(73) Assignees: RHODIA OPERATIONS, Lyons (FR); GEORGES PERNOUD SAS, Oyonnax (FR); BILLION SAS, Bellignat (FR)

( * ) Notice: Subject to any disclaimer, the term of this patent is extended or adjusted under 35 U.S.C. 154(b) by 52 days.

(21) Appl. No.: 17/057,455

(22) PCT Filed: May 21, 2019

(86) PCT No.: PCT/EP2019/063157
§ 371 (c)(1),
(2) Date: Nov. 20, 2020

(87) PCT Pub. No.: WO2019/224220
PCT Pub. Date: Nov. 28, 2019

(65) Prior Publication Data
US 2021/0197428 A1 Jul. 1, 2021

(30) Foreign Application Priority Data
May 24, 2018 (EP) ..................................... 18305634

(51) Int. Cl.
*B29C 70/34* (2006.01)
*B29C 45/00* (2006.01)
(Continued)

(52) U.S. Cl.
CPC ...... *B29C 45/0001* (2013.01); *B29C 45/0005* (2013.01); *B29C 45/561* (2013.01);
(Continued)

(58) Field of Classification Search
CPC ..... B29C 45/14; B29C 45/561; B29C 70/467; B29C 70/48; B29C 70/561; B29C 70/345
See application file for complete search history.

(56) References Cited

U.S. PATENT DOCUMENTS 5,690,880 A * 11/1997 Le Coent .............. B29C 43/184
264/266
9,296,143 B2 * 3/2016 Kashima ............. B29C 45/0055
(Continued)

FOREIGN PATENT DOCUMENTS

DE 102010052180 A1 5/2012
EP 0765722 A1 4/1997
(Continued)

*Primary Examiner* — Edmund H Lee
(74) *Attorney, Agent, or Firm* — Osha Bergman Watanabe & Burton LLP

(57) ABSTRACT

The present invention relates to the use of thermoplastic polymer compositions for impregnating reinforcing materials in the form of fabric or industrial fabrics for the manufacture of composite materials. The field of the invention is that of composite materials as well as molding/consolidation processes and obtained parts. The invention more particularly relates to a method of manufacturing a composite article by injection molding comprising at least the steps of introducing at least one reinforcement fabric into a preheated mold, partial closure of the mold, a temperature rise step of the mold, optionally a step of maintaining the temperature of the mold before injection of a thermoplastic polymer composition, a step of injecting a thermoplastic polymer composition into the mold, a step of mold closure to the final part thickness allowing the flow of the resin
(Continued)

through the reinforcing fabric, a cooling step and a recovery step of the obtained composite article.

19 Claims, 3 Drawing Sheets

(51) Int. Cl.
*B29C 70/46* (2006.01)
*B29C 70/48* (2006.01)
*C08J 5/04* (2006.01)
*B29C 45/56* (2006.01)
*B29K 81/00* (2006.01)
*B29K 105/00* (2006.01)
*B29K 307/04* (2006.01)

(52) U.S. Cl.
CPC .......... *B29C 70/345* (2013.01); *B29C 70/467* (2013.01); *B29C 70/48* (2013.01); *C08J 5/042* (2013.01); *C08J 5/043* (2013.01); *B29K 2081/04* (2013.01); *B29K 2105/0058* (2013.01); *B29K 2105/0088* (2013.01); *B29K 2307/04* (2013.01); *B29K 2995/004* (2013.01); *B29K 2995/0039* (2013.01); *C08J 2377/06* (2013.01); *C08J 2381/02* (2013.01)

(56) References Cited

U.S. PATENT DOCUMENTS

| | | | |
|---|---|---|---|
| 10,584,241 B2* | 3/2020 | Orange | B29C 70/52 |
| 10,723,879 B2* | 7/2020 | Orange | C08L 77/06 |
| 2012/0225241 A1* | 9/2012 | Kashima | B29C 51/02 |
| | | | 428/80 |
| 2013/0001817 A1 | 1/2013 | Bessho et al. | |
| 2018/0346666 A1 | 12/2018 | Capelot et al. | |

FOREIGN PATENT DOCUMENTS

| | | |
|---|---|---|
| FR | 2953755 A1 | 6/2011 |
| JP | 2007175920 A | 7/2007 |
| WO | 2017098178 A1 | 6/2017 |

* cited by examiner

PROCESS FOR MANUFACTURING COMPOSITE ARTICLES

CROSS-REFERENCE TO RELATED APPLICATIONS

The present application is a U.S. national phase entry under 35 U.S.C. § 371 of International Application No. PCT/EP2019/063157, filed on 21 May 2019, which claims priority to EP applications No. 18305634.0, filed on 24 May 2018, the entire content of each of these applications is explicitly incorporated herein by reference.

TECHNICAL FIELD

The present invention relates to the use of thermoplastic polymer compositions for impregnating reinforcing materials in the form of fabric or industrial fabrics for the manufacture of composite materials. The field of the invention is that of composite materials as well as molding/consolidation processes and obtained parts. The invention more particularly relates to a method of manufacturing a composite article by injection molding comprising at least the steps of introducing at least one reinforcement fabric into a preheated mold, partial closure of the mold, a temperature rise step of the mold, optionally a step of maintaining the temperature of the mold, a step of injecting a thermoplastic polymer composition into the mold, a step of closing the mold allowing the polymer to flow through the reinforcing fabric and causing the article to achieve its final thickness, a cooling step and a recovery step of the obtained composite article.

BACKGROUND ART

In the field of high-performance materials, composites have taken a prominent place, due to their performance and the weight savings they allow. The high-performance composites most known to date, are obtained from thermosetting resins, the use of which is limited to low to medium series applications, mainly in aeronautics, energy and motor sports, and with manufacturing times ranging from a few tens of minutes in the best cases to several hours which includes time required for curing the thermosetting resins. The cost of these materials, and/or the manufacturing time, makes them difficult to compatibilize with mass use. In addition, the use of thermosetting resins often involves the presence of solvents and reactive precursors (monomers, catalysts, etc.). Finally, these composites are difficult to recycle.

Thermoplastic polymers have a number of advantages over thermosets, which allows them to be considered as very interesting opportunities for the development of composite structures, especially in mass markets such as automotive, railway, energy, sports and leisure or more limited but developing markets such as aeronautics. These advantages include among others good intrinsic mechanical performance, including ductility, impact resistance and fatigue, good chemical stability, including against solvents, and total recyclability of consolidated parts.

The development of thermoplastic polymer based articles bearing continuous reinforcement is currently limited in particular by process problems, including production rate and costs. The polymers available in the marketplace have a high melt viscosity, typically greater than 250 Pa·s which makes it difficult to impregnate the reinforcing fabrics, especially when fiber content is greater than 50% by volume.

The difficulty of impregnating that is associated with thermoplastic matrices available on the market either requires prolonged impregnation times, or significant operating pressures which causes problems with large parts. In most cases, composite materials obtained from these matrices may have microvoids and poorly impregnated areas. These microvoids may cause mechanical failures, premature aging of the material and delamination problems when the material consists of several layers of reinforcements (laminates).

The phenomenon of loss of mechanical properties gets even more prominent if one seeks to decrease cycle times for the manufacture of composite articles. The high level of viscosity of the polymers imposes limits with regard to the forming technologies, and does not allow the production of parts with complex geometries.

To overcome the issues associated with high resin viscosity, various approaches have been developed, such as commingling technologies or coating of fiber strands, the polymer being positioned closer to the reinforcement in order to obtain proper reinforcement; or the use of low viscosity reactive precursors (e.g. caprolactam, lauryllactam, CBT® resin) with in-situ polymerization in the reinforcement after impregnation; or the use of oligomers (pre-polymers) of reduced viscosity in the presence of chain extenders, and in-situ polymer chain extension after impregnation of the reinforcing material. Further, thermoplastic polymers with very low melt viscosity have been developed, allowing access to an alternative path to in-situ polymerization and employing resin transfer molding (RTM TP) or pultrusion (injection-pultrusion TP) technologies (cf. eg. US 2011/231249 A1, US 2012/322326 A1, US 2012/238164 A1, US 2013/115836 A1, US 2017/342267 A1 and US 2017/342268 A1). These approaches, however, have a certain number of drawbacks, be it in terms of processability, final performance or cost, which limit their application especially for mass markets. Only thermoplastic polymers having a melt viscosity of less than 50 Pa·s are suitable to be employed in said RTM TP processes as otherwise flow of the polymer melt through the reinforcement fiber material becomes difficult, requiring injection pressure rise and causing defective products.

The object of the present invention is therefore to overcome these disadvantages by providing a composite article that can be manufactured with short cycle times while having good use properties, such as good mechanical properties. Another objective is to propose composite articles that can have relatively complex shapes such as strongly marked double curvatures.

It has been found possible to obtain composite articles from semi-crystalline or amorphous thermoplastic polymeric materials by using, in particular, compression resin transfer molding (C-RTM TP) technology, a technology commonly used with thermosetting resin composites. The mechanical performance of these articles is similar to that obtained by conventional thermoforming techniques, such as film stacking for example. The C-RTM TP molding process involves injecting resin at low pressures into an only partially closed mold in which long or continuous reinforcing fibers, such as glass, carbon or aramid fibers, have previously been placed and effecting compression by completely closing ("clamping") or partially closing (no clamping) the mold after injection.

US 2013/0001817 A1 is e.g. disclosing a method for manufacturing a fiber-reinforced thermoplastic composite material via injection-compression molding including the steps of (a) of placing a non-woven fabric N made of a reinforcement fiber in a movable mold, and the step (b) of moving the movable mold toward a fixed mold to close and clamp the mold and then injecting a thermoplastic resin into the mold to obtain a molded article formed of the non-woven fabric N and the thermoplastic resin. The mechanical strength of the obtained fiber-reinforced composite material can be enhanced by applying a compression molding process as the injection molding process in the step b). Maximum fiber length is lower or equal to 9 mm, and fiber content of the composite material is substantially below 50% by weight as proven by the level of mechanical properties of the composite material.

Nevertheless, injection-compression processes of the prior art because of the still high pressures to be employed during the compression step may be inadequate to meet cycle time requirements and/or providing composite parts of superior mechanical performance. The use of high process pressure as well as a high pressure rate upon closure of the mold lead to substantial deformation of the fibrous reinforcement material and negatively impact the mechanical properties of the composite parts.

In fabricating composite parts employing part materials such as amorphous polymers having a glass transition temperature of from 80° C. to 250° C., and semi-crystalline polymers having a melting temperature of from 100° C. to 380° C. and the like, improved injection molding processes are required imposing reduced mechanical stress on reinforcing fiber materials, thus reducing deformation of fibrous reinforcement, to provide high strength composite parts.

Hence, there is a continuous quest for improved injection molding processes simultaneously responding to performance and economical requirements.

INVENTION

Unless specifically disclosed otherwise, all temperatures herein are in degrees Celsius (° C.).

It has unexpectedly been discovered that composite articles may be manufactured from a variety of semi-crystalline or amorphous thermoplastic polymers by employing a modified compression resin transfer molding (C-RTM TP) technology. The obtained articles have excellent mechanical properties and can be manufactured in attractive cycle times. The articles thus obtained exhibit excellent impregnation of the reinforcement material providing them good rigidity and tensile strength, good impact resistance, and good fatigue behavior, and this at relatively low injection pressures of typically less than 0.5 MPa, preferably less than 0.25 MPa, and cycle times corresponding to the volume of reinforcement to be impregnated, and without any other pre or post molding treatment. This makes it possible to provide a composite material having the advantage of reduced manufacturing costs, and the manufacture of parts that can have relatively complex shapes, by the use of a low pressure tooling using short cycle times.

The articles according to the invention have in particular the advantages of stiffness, lightness, and recyclability, as well as a good surface appearance, with the possibility of presenting strongly marked double curvatures.

The invention makes it possible to produce articles of relatively complex geometry, the reinforcement being introduced either in the form of an assembly of pre-cut plies or in the form of a previously formed 3D preform in order to present the desired geometry.

The invention firstly relates to a process for manufacturing a composite article by injection molding a polymer composition comprising at least one semi-crystalline thermoplastic polymer and/or at least one amorphous thermoplastic polymer, comprising the following steps:

(a) Introducing at least one reinforcement material into a preheated mold having a temperature $T_1$ that is in the range of from 50° C., preferably of from 75° C., to a temperature $T_1^{max}$, wherein $T_1^{max}$ is defined as follows:

$$T_1^{max}=T_g^{max}+40°\ C., \qquad (i)$$

if the polymer composition has no melting transition, or if the polymer composition has at least one melting transition and the highest melting temperature $T_m^{max}$ of the polymer composition is lower than $T_g^{max}+40°$ C., wherein $T_g^{max}$ denotes the highest glass transition temperature of the polymer composition, or $$T_1^{max}=T_m^{max}, \qquad (ii)$$

if the polymer composition has at least one melting transition and the highest melting temperature $T_m^{max}$ of the polymer composition is equal or greater than $T_g^{max}+40°$ C.;

(b) partially closing the mold, such that the mold exhibits an open gap with a volume of from 70% to 200% of the polymer volume to be injected;

(c) raising the temperature of the mold to a temperature $T_2$ that is in the range of from $T_2^{min}$ to $T_2^{max}$, wherein $T_2^{min}$ and $T_2^{max}$ are defined as follows:

$$T_2^{min}=T_g^{max}+50°\ C.,\ T_2^{max}=T_g^{max}+300°\ C., \qquad (i)$$

if the polymer composition has no melting transition, or $$T_2^{min}=T_g^{max}+50°\ C.,\ T_2^{max}=T_g^{max}+150°\ C., \qquad (ii)$$

if the polymer composition has at least one melting transition and the highest melting temperature $T_m^{max}$ of the polymer composition is lower than $T_g^{max}+40°$ C., or $$T_2^{min}=T_m^{max}+10°\ C.,\ T_m^{max}=T_m^{max}+100°\ C., \qquad (iii)$$

if the polymer composition has at least one melting transition and the highest melting temperature $T_m^{max}$ of the polymer composition is equal or greater than $T_g^{max}+40°$ C.;

(d) optionally maintaining the temperature of the mold for a period of time;

(e) injecting a polymer composition having a melt viscosity of from 5 to 200 Pa·s, determined at the temperature of step (c) and a shear rate of 100 s$^{-1}$, into the mold, filling the free cavity obtained by partial closure of the mold;

(f) closing the mold to the final thickness of the part, maintaining the temperature of step (c), employing a compression rate of from 0.001 to 0.5 mm/s and permitting the mold pressure to rise to a range of from 0.2 to 17.5 MPa, preferably of from 0.5 to 10 MPa;

(g) cooling the mold to a temperature $T_3$ that is in the range of from $T_3^{min}$ to $T_3^{max}$, wherein $T_3^{min}$ and $T_3^{max}$ are defined as follows:

$$T_3^{min}=T_g^{min}-100°\ C.,\ T_3^{max}=T_g^{min}+50°\ C., \qquad (i)$$

if the polymer composition has no crystallization transition, and wherein $T_g^{min}$ denotes the lowest glass transition temperature of the polymer composition; or $$T_3^{min}=T_c^{min}-120°\ C.,\ T_3^{max}=T_c^{min}+25°\ C., \qquad (ii)$$

if the polymer composition has at least one crystallization transition, and wherein $T_c^{min}$ denotes the lowest crystallization temperature of the polymer composition;

(h) opening the mold, ejecting and recovering the produced composite article.

The term reinforcement material is intended to mean any type of material other than the polymer matrix, preferably a textile structure obtained by assembling yarns or fibers rendered integral by any method, such as, in particular, adhesive bonding, felting, braiding, weaving, sewing or knitting. These materials are also referred to as fibrous or filamentary networks. Yarn is understood to mean a monofilament, a continuous multifilament yarn, or a staple fiber yarn, obtained from fibers of a single type or from several types of fibers as an intimate mixture. The continuous yarn can also be obtained by assembling several multifilament yarns. Fiber is understood to mean a filament or a combination of filaments, which are cut, cracked or converted.

The reinforcing yarns and/or fibers according to the invention are preferably chosen from yarns and/or fibers formed of carbon, glass, aramids, polyimides, flax, hemp, sisal, coir, jute, kenaf and/or mixtures thereof. More preferably, the reinforcement materials are composed solely of reinforcing yarns and/or fibers that are compatible with the polymer matrix and are chosen from yarns and/or fibers of formed of carbon, glass, aramids, polyimides, flax, hemp, sisal, coir, jute, kenaf and/or mixtures thereof.

These reinforcement materials preferably have a grammage, i.e. a weight per square meter of from 50 to 5,000 $g/m^2$, more preferably of from 100 to 1,200 $g/m^2$.

Their structure may be random, unidirectional (1D), or multidirectional (2D, 2.5D, 3D or other).

A composite article according to the invention may comprise several reinforcing materials which are identical or different in nature or architecture.

Preferably, the reinforcement material is introduced in the form of a previously formed 3D preform in order to present the desired geometry.

The reinforcement material may be heated before its introduction into the preheated mold.

To facilitate impregnation, it may be advantageous to use, in combination with the reinforcement material, drainage materials or fabrics which will facilitate the flow of the resin. The reinforcement material may be preformed in particular by using a thermosetting or thermoplastic based binder.

Semi-crystalline polymer according to the invention may be chosen from the group comprising polyolefins, polyamides, polyarylene sulphides (PPS), polyarylether sulfones, partially aromatic polyesters (such as PET, PBT), polyacetal (POM), polyaryletherketone (PAEK, especially PEEK and PEKK) and mixtures thereof.

Polyamides may be chosen from at least one semi-aromatic polyamide comprising (i) recurring units obtained by the polycondensation reaction between at least one non-aromatic diacid or derivative thereof and at least one aromatic diamine and/or (ii) recurring units obtained by the polycondensation reaction between the polycondensation reaction of at least one aromatic diacid and at least one non-aromatic diamine.

A diacid (or derivative thereof) or a diamine is considered for the purpose of this invention as "aromatic" when it comprises one or more than one aromatic group. A diacid (or derivative thereof) or a diamine or an amino-carboxylic acid (or derivative thereof) is considered for the purpose of this invention as "non-aromatic" when it is free of aromatic groups.

Specifically, more than 50 mole % of the recurring units of the semi-aromatic polyamide (PA1) are obtainable by (and preferably, obtained by) the polycondensation reaction between at least one non-aromatic diacid (or derivatives thereof) and an aromatic diamine.

Preferably more than 75 mole %, and more preferably more than 85 mole % of said recurring units can be obtained (and preferably, are obtained) by the polycondensation reaction between at least one aliphatic diacid or derivative thereof and at least one aromatic diamine. Still more preferably, essentially all or even all the recurring units of the semi-aromatic polyamide (PA1) can be obtained (and preferably, are obtained) by the polycondensation reaction between at least one aliphatic diacid or derivative thereof and at least one aromatic diamine.

The term diacid derivative is intended to encompass acid halogenides, especially chlorides, acid anhydrides, acid salts, acid amides and the like, which can be advantageously used in the polycondensation reaction.

The expression "at least one aliphatic diacid or derivative thereof" and "at least one aromatic diamine" are understood to mean that one or more than one aliphatic diacid or derivative thereof and one or more than one aromatic diamine can be made to react as above specified.

The aromatic diamine is preferably a $C_6$-$C_{24}$-aromatic diamine, more preferably a $C_6$-$C_{18}$-aromatic diamine, still more preferably a $C_6$-$C_{10}$-diamine such as m-xylylenediamine (MXDA). The aromaticity of the aromatic diamine results preferably from the presence therein of m-phenylene and/or o-phenylene groups, in a total amount ranging generally from 1 to 2.

Non limitative examples of aromatic diamines include m-phenylene diamine (MPD), p-phenylene diamine (PPD), 3,4'-diaminodiphenyl ether (3,4-ODA), 4,4'-diaminodiphenyl ether (4,4'-ODA) and m-xylylenediamine (MXDA), as shown below:

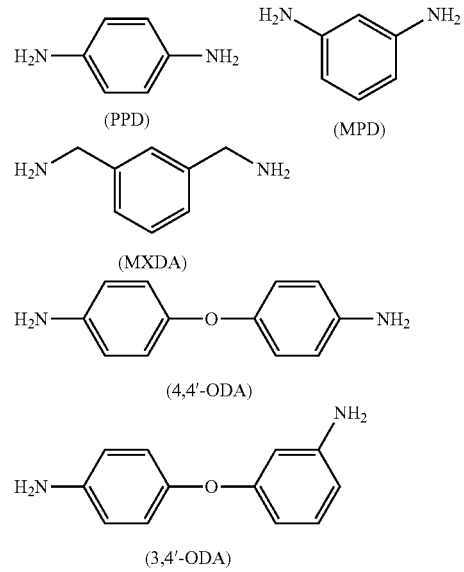

and p-xylylenediamine (PXDA, not represented).

The aliphatic diacid is preferably a $C_2$-$C_{16}$-aliphatic diacid, more preferably a $C_4$-$C_{12}$-aliphatic diacid, still more preferably a $C_6$-$C_{10}$-aliphatic diacid such as adipic acid. The aliphatic diacid is preferably linear.

As above mentioned, such aliphatic diacids can be used in the polycondensation reaction notably in the form of free acids and/or acid chlorides.

Non limitative examples of aliphatic diacids are notably oxalic acid (HOOC—COOH), malonic acid (HOOC—$CH_2$—COOH), succinic acid [HOOC—$(CH_2)_2$—COOH], glutaric acid [HOOC—$(CH_2)_3$—COOH], 2,2-dimethyl-glutaric acid [HOOC—$C(CH_3)_2$—$(CH_2)_2$—COOH], adipic acid [HOOC—$(CH_2)_4$—COOH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecanedioic acid [HOOC—(CH$_2$)$_{10}$—COOH] and tetradecanedioic acid [HOOC—(CH$_2$)$_{12}$—COOH]. Cycloaliphatic diacids comprising at least one carbocyclic ring with of from 4 to 8 carbon atoms in the ring, like e.g. cyclohexane dicarboxylic acids may also be used.

According to an embodiment of the invention, MXD6 polymers are used as polyamides (PA1).

For the purpose of the present invention, a MXD6 polymer is intended to denote a semi-aromatic polyamide essentially all, if not all, the recurring units of which are obtainable by (and preferably, obtained by) the polycondensation reaction of adipic acid with meta-xylylene diamine.

MXD6 polymers and other polymers suitable as the polyamide (PA1) are commercially available notably from Mitsubishi Gas Chemicals. Polymer materials comprising MXD6 and a second polyamide (e.g. of the type as hereinafter referred to as polyamide (PA3)) are notably commercially available as IXEF® polyamides from Solvay Advanced Polymers, L.L.C.

For the purpose of the present invention, it should be understood that the definition "semi-aromatic polyamide (PA1)" also encompasses polyamides further comprising less than 50 mole %, preferably less than 25 mole % and more preferably less than 15 mole % of recurring units obtainable by (and preferably, obtained by) the polycondensation reaction between at least one aliphatic diacid or derivative thereof, as above specified, and at least one aliphatic diamine. In this particular embodiment, said at least one aliphatic diamine may be a comonomer used in conjunction with one of the aromatic diamines as specified above. Said aliphatic diamine may be selected, for instance, among 1,2-diaminoethane, 1,2-diaminopropane, propylene-1,3-diamine, 1,3-diaminobutane, 1,4-diaminobutane, 1,5-diaminopentane, 1,6-hexanediamine or hexamethylenediamine (HMDA), 1,8-diaminooctane, 1,10-diaminodecane, 1,12-diaminododecane, and 1-amino-3-N-methyl-N-(3-aminopropyl)-aminopropane. A preferred aliphatic diamine is hexamethylenediamine (HMDA). Cycloaliphatic diamines comprising at least one carbocyclic ring having of from 4 to 8 carbon atoms in the ring, like e.g. 1,3-bis(aminomethyl) cyclohexane, bis-(4-aminocyclohexyl)methane or bis(3-methyl-4-aminocyclohexyl)methane are also suitable.

The content of the polyamide (PA1) in the polymer composition of the present invention is from 0 to 50 wt. %, more preferably from 0 to 40 wt. %, even more preferably from 0 to 30 wt. %, still more preferably from 0 to 20 wt. % and most preferably from 0 to 10 wt. %, based on the total weight of the polymer components of the polymer composition.

The polymer composition of the present invention may also comprise at least one semi-aromatic polyamide (PA2) or at least one polyamide (PA3) or mixtures thereof.

More than 50 mole % of the recurring units of the semi-aromatic polyamide (PA2) are obtainable by (and preferably, obtained by) the polycondensation reaction between at least one aromatic diacid or derivative thereof and at least one aliphatic diamine.

The expression "at least one aromatic diacid or derivative thereof" and "at least one aliphatic diamine" are understood to mean that one or more than one aromatic diacid or derivative thereof and one or more than one aliphatic diamine can be made to react as above specified.

Non limitative examples of aliphatic diamines are notably 1,2-diaminoethane, 1,2-diaminopropane, propylene-1,3-diamine, 1,3-diaminobutane, 1,4-diaminobutane, 1,5-diaminopentane, 1,6-diaminohexane or hexamethylenediamine (HMDA), 1,8-diaminooctane, 1,9-diaminononane, 2-methyl-1,8-diaminooctane, 1,10-diaminodecane, 1,12-diaminododecane, 2-methyl-1,5-diaminopentane, 1-amino-3-N-methyl-N-(3-aminopropyl)-aminopropane, 1,3-bis(aminomethyl)cyclohexane, bis-(4-aminocyclohexyl)methane or bis(3-methyl-4-aminocyclohexyl)methane.

A preferred aliphatic diamine is hexamethylenediamine (HMDA).

Aromatic diacids and derivatives thereof employed in the polycondensation reaction to yield the semi-aromatic polyamide (PA2) are not particularly restricted. Non limitative examples of aromatic diacids are notably phthalic acids, including isophthalic acid (IPA), terephthalic acid (TPA) and orthophthalic acid (OPA), naphthalenedicarboxylic acids, 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone and bis(3-carboxyphenoxy)benzene.

Preferably, the semi-aromatic polyamide (PA2) is a polyphthalamide, i.e. an aromatic polyamide of which more than 50 mole % of the recurring units are obtainable by (and preferably, obtained by) the polycondensation reaction between at least one phthalic acid, chosen among IPA, TPA and PA, or derivatives thereof, and at least one aliphatic diamine.

For the avoidance of doubt, the chemical structures of TPA, IPA, PA are depicted herein below:

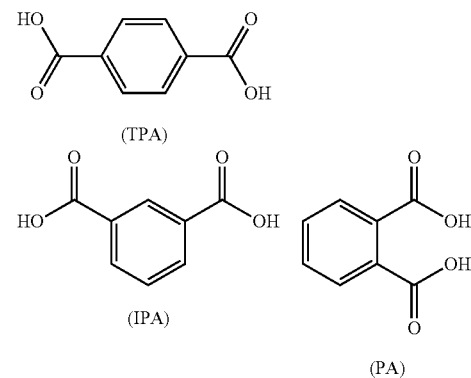

Examples of polyphthalamides obtainable by (and preferably, obtained by) the polycondensation reaction between at least one phthalic acid, chosen among IPA, TPA and PA, or derivatives thereof, and at least one aliphatic diamine include (i) PA10T and copolymers of PA10T, (ii) PA 6T/66, (iii) PA 6T/DT, (iv) PA6T/6I, and (v) PA 9T/XT wherein these terms denote polyamides obtainable by (and preferably, obtained by) the polycondensation reaction between (i) TPA and 1,10-diaminodecane, and optionally further aliphatic diamines; (ii) TPA, adipic acid, and HMDA; (iii) TPA, HMDA, and 2-methyl-1,5-diaminopentane; (iv) TPA, IPA and HMDA; and (v) TPA, 1,9-diaminononane and 2-methyl-1,8-diaminooctane.

Suitable polyphthalamides in accordance with this preferred embodiment are notably available as AMODEL® polyphthalamides from Solvay Advanced Polymers L.L.C.

The semi-aromatic polyamides (PA2) may particularly preferably be chosen from poly(tere/iso)phthalamides.

For the purpose of the present invention, poly(tere/iso) phthalamides are defined as aromatic polyamides of which:

(i) more than 50 mole % of the recurring units are formed by the polycondensation reaction between terephthalic acid, isophthalic acid and at least one aliphatic diamine;

(ii) more than 25 and up to 50 mole % of the recurring units are formed by the polycondensation reaction between terephthalic acid and at least one aliphatic diamine; and (iii) from 1 to 25 mole % of the recurring units are formed by the polycondensation reaction between isophthalic acid and at least one aliphatic diamine.

Poly(tere/iso)phthalamides may further comprise recurring units formed by the polycondensation reaction between at least one aliphatic diacid and at least one aliphatic diamine. In addition, poly(tere/iso)phthalamides are preferably free of recurring units formed by the polycondensation reaction between (ortho)phthalic acid (PA) and at least one diamine (aliphatic or aromatic).

The semi-aromatic polyamide (PA2) may also be chosen from polyterephthalamides or polyisophthalamides.

For the purpose of the present invention, polyterephthalamides respectively polyisophthalamides are defined as aromatic polyamides of which more than 50 mole % of the recurring units are formed by the polycondensation reaction between terephthalic respectively isophthalic acid and at least one aliphatic diamine.

A first class of polyterephthalamides respectively polyisophthalamides consists of respective polyamides essentially all, if not all, the recurring units of which are formed by the polycondensation reaction between terephthalic acid respectively isophthalic acid and at least one aliphatic diamine [class (I)].

A second class of polyterephthalamides respectively polyisophthalamides consists of respective polyamides essentially all, if not all, the recurring units of which are formed by the polycondensation reaction between mixtures of terephthalic acid and isophthalic acid and at least one aliphatic diamine [class (II)]. The molar ratio of terephthalic acid to isophthalic acid is not subject to particular restrictions and may be generally in the range of from 85:15 to 15:85, preferably in the range of from 70:30 to 30:70.

A third class of polyterephthalamides respectively polyisophthalamides consists of respective polyamides essentially all, if not all, the recurring units of which are formed by the polycondensation reaction between mixtures of terephthalic acid respectively isophthalic acid and at least one aliphatic diacid, and at least one aliphatic diamine [class (III)]. Such recurring units are respectively referred to as terephthalamide respectively isophthalamide and aliphatic acid-amide recurring units.

Within class (III), a subclass consists of polyterephthalamides respectively polyisophthalamides in which the mole ratio of the terephthalamide respectively isophthalamide recurring units based on the total number of moles of the recurring units (i.e. the terephthalamide respectively isophthalamide plus the aliphatic acid-amide recurring units) is 60 mole % or more; in addition, it is advantageously 80 mole % or less, and preferably 70 mole % or less [subclass (III-1)].

Within class (III), a second subclass consists of polyterephthalamides respectively polyisophthalamides in which the mole ratio of the terephthalamide respectively isophthal-amide recurring units based on the total number of moles of the recurring units (i.e. the terephthalamide respectively isophthalamide plus the aliphatic acid-amide recurring units) is less than 60 mole % [subclass (III-2)].

A fourth class of polyterephthalamides respectively polyisophthalamides consists of respective polyamides essentially all, if not all, the recurring units of which are formed by the polycondensation reaction between terephthalic acid, isophthalic acid, at least one aliphatic diacid and at least one aliphatic diamine [class (IV)].

Aliphatic acids and aliphatic amines useful for classes (I) to (IV) are those above described as suitable for polymers (PA1) and (PA2).

According to another embodiment, the polymer composition in accordance with the instant invention comprises at least one aliphatic polyamide (PA3).

More than 50 mole % of the recurring units of the aliphatic polyamide (PA3) are obtained by the polycondensation reaction between an aliphatic diacid (and/or a derivative thereof) and an aliphatic diamine, and/or by the auto-polycondensation reaction of at least one of an amino carboxylic acid and of a lactam. Aliphatic diacids and aliphatic diamines are those above described as suitable for polymers (PA1) and (PA2).

Preferably more than 75 mole % and more preferably more than 85 mole % of the recurring units of the aliphatic polyamide (PA3) are obtainable by (and preferably, obtained by) the polycondensation reaction between an aliphatic diacid (and/or a derivative thereof) and an aliphatic diamine, and/or by the auto-polycondensation reaction of an amino carboxylic acid and/or a lactam. Still more preferably, essentially all or even all the recurring units of the aliphatic polyamide (PA3) are obtainable by (and preferably, obtained by) the polycondensation reaction between at least one aliphatic diacid or derivative thereof and at least one aliphatic diamine.

The aliphatic polyamide (PA3) is preferably selected from the group consisting of polytetramethylene adipamide (nylon 46), poly(hexamethylene adipamide) (nylon 66), poly (hexamethylene azelamide) (nylon 69), poly(hexamethylene sebacamide) (nylon 610), poly(hexamethylene dodecanoamide) (nylon 612), poly(dodecamethylene dodecanoamide) (nylon 1212), poly(11-amino-undecano-amide) (nylon 11), and copolymers and mixtures thereof.

Examples of polyamides obtainable by (and preferably, obtained by) the auto-polycondensation reaction of an amino carboxylic acid and/or a lactam are polycaprolactam (nylon 6), and poly(11-amino-undecano-amide) (nylon 11).

More preferably, the aliphatic polyamide (PA3) is chosen from nylon 6 and nylon 66.

Still more preferably, the aliphatic polyamide (PA3) is nylon 66, i.e. the polyamide obtained by the polycondensation reaction between 1,6-hexamethylenediamine and adipic acid (and/or a derivative thereof).

Polyamides employed in the polymer composition of the present invention can in particular be obtained by controlling their molecular structure from a linear polymer to a star-like polymer, or by controlling their molecular weight during the synthesis thereof, in particular by the addition, before or during the polymerization of the polyamide monomers, of monomers which modify the length of the chains, such as, in particular, diamines, dicarboxylic acids, monoamines and/or monocarboxylic acids. It is also possible to add multifunctional compounds to the polymerization.

Polyamides employed in the polymer composition of the present invention can also be obtained by blending, in particular melt blending, polyamides with monomers which modify the length of the chains, such as, in particular, diamines, dicarboxylic acids, monoamines and/or monocarboxylic acids.

A polymer composition of the invention may also comprise copolyamides derived in particular from the above polyamides, or the blends of these polyamides or (co) polyamides.

For the purpose of the present invention, a poly(arylene sulphide) (PPS) is intended to denote a polymer of which more than 50 wt. % of the recurring units are recurring units (R2) of one or more formula of the general type:

(R2)

wherein the Ar group denotes an optionally substituted arylene group, such a phenylene or a naphthylene group, which is linked by each of its two ends to two sulfur atoms forming sulphide groups via a direct C—S linkage. Preferred recurring units Ar are optionally substituted p-phenylene (resulting in recurring units (R2) like

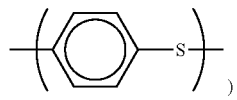

and optionally substituted m-phenylene (resulting in recurring units (R2) like

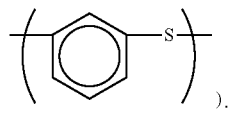

The optionally substituted arylene group Ar may be unsubstituted, which is often preferred.

In certain embodiments, the optionally substituted arylene group Ar may be substituted by one or more substituting groups, including but not limited to halogen atoms, $C_1$-$C_{12}$ alkyls, $C_7$-$C_{24}$ alkylaryls, $C_7$-$C_{24}$ aralkyls, $C_6$-$C_{18}$ aryls, $C_1$-$C_{12}$ alkoxy groups, and $C_6$-$C_{18}$ aryloxy groups, and substituted or unsubstituted arylene sulphide groups themselves, the arylene groups of which are also linked by each of their two ends to two sulfur atoms forming sulphide groups via a direct C—S linkage, like in:

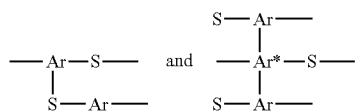

thereby creating branched, up to cross-linked polymer chains.

The poly(arylene sulphide) contains preferably more than 70 wt. %; more preferably more than 80 wt. %, and still more preferably more than 90 wt. % of recurring units (R2). Most preferably, it contains no recurring unit other than (R2).

A preferred poly(arylene sulphide) is poly(phenylene sulphide), i.e., a polymer of which more than 50 wt. % of the recurring units are recurring units of one or more formula of the general type:

(R3)

wherein the pPh group denotes an optionally substituted p-phenylene group which is linked by each of its two ends to two sulfur atoms forming sulphide groups via a direct C—S linkage. pPh may be unsubstituted, which is often preferred.

In certain embodiments, pPh may be substituted by one or more substituting groups, including but not limited to halogen atoms, $C_1$-$C_{12}$ alkyls (resulting in substituted units (R3) like

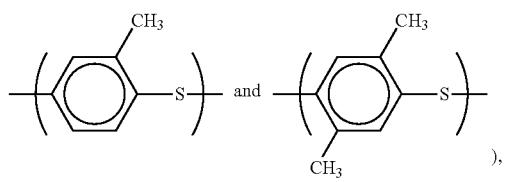

$C_7$-$C_{24}$ alkylaryls, $C_7$-$C_{24}$ aralkyls, $C_6$-$C_{18}$ aryls, $C_1$-$C_{12}$ alkoxy groups, $C_6$-$C_{18}$ aryloxy groups, and substituted or unsubstituted arylene sulphide groups themselves (possibly, substituted or unsubstituted p-phenylene sulphide groups themselves), the arylene groups of which are also linked by each of their two ends to two sulfur atoms forming sulphide groups via a direct C—S linkage, such as:

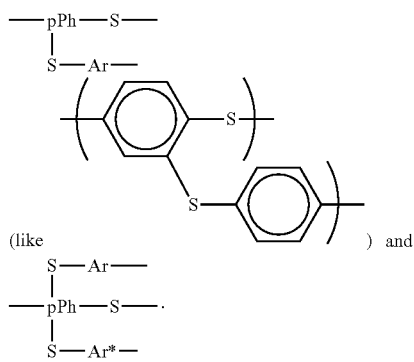

The polyphenylene sulphide contains preferably more than 70 wt. %; more preferably more than 80 wt. %, and still more preferably more than 90 wt. % of recurring units (R3).

The poly(arylene sulphide), in particular the poly(phenylene sulphide), may further comprise recurring units other than (R2); non limitative examples of recurring units other than (R2) are those recurring units capable of being formed by the reaction between $Na_2S$ and a dihalocompound of general formula Cl—Ar°-D-Ar°—Cl through the elimination of the chlorine atoms from the dihalocompound:

$Na_2S$+Cl—Ar°-D-Ar°—Cl—Ar°-D-Ar°—S— recurring unit (R4)

wherein Ar° is an optionally substituted arylene group and D may be any diradical other than sulphide (—S—) or than a sulphide-determinate diradical (—S-D'-S—, where D' may be any diradical).

Both fragments —Ar°—S— of the recurring units (R4) differ from a recurring unit (R2) in that none of the optionally substituted groups Ar° is linked by each of its two ends to two sulfur atoms forming sulphide groups via a direct C—S linkage, at least one end of each arylene group Ar° being linked to D as above defined.

Non limitative examples of recurring units (R4) include:
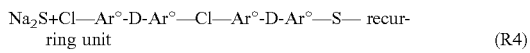, like

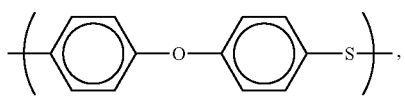

—Ar°—S(=O)$_2$—Ar°—S—, like

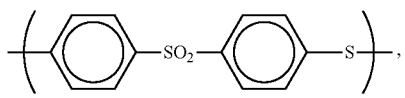

—Ar°—C(=O)—Ar°—S—, like

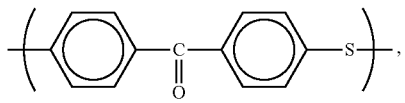

and mixtures thereof, wherein the diradical D is respectively an oxy, sulfonyl or carbonyl diradical.

Good results are obtained when the poly(arylene sulphide) contains no recurring unit other than recurring units (R2). Very good results are obtained when the poly(arylene sulphide) is a poly(phenylene sulphide) which contains no recurring unit other than recurring units (R3). Excellent results can be obtained when the poly(arylene sulphide) is a poly(phenylene sulphide) which contains no recurring unit other than unsubstituted p-phenylene recurring units.

Poly(arylene sulphide)s are commercially available from sources such as Solvay Specialty Polymers USA, LLC, Fortron Industries, and GE Plastics. Commercial grades of poly(arylene sulphide)s include RYTON®, PRIMEF®, FORTRON®, and SUPEC® poly(phenylene sulphide)s.

As above explained, the poly(arylene sulphide) (P2) may be in the form of a linear polymer, a branched polymer and/or a cross-linked polymer.

Preferred amorphous thermoplastic polymers according to the invention may be chosen from the group comprising cellulosics, polyacrylates, polystyrene, polycarbonate, polyurethane, polydimethylphenylene ether, polysulfone, polyarylether sulfone, polyetherimide, polyamideimide, and mixtures thereof.

For the purpose of the present invention, a polyarylether sulfone is intended to denote any polymer of which more than 50 wt. % of the repeat units comprise at least one arylene group, [especially, at least one p-phenylene group

at least one ether group (—O—) and at least one sulfone group

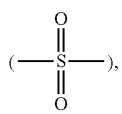

based on the total weight of the repeat units of the polymer.

The polyarylethersulfone comprises generally recurring units (R1)

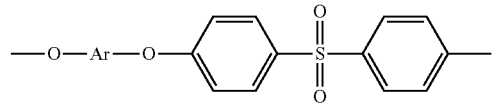

(R1)

wherein Ar is an aromatic divalent group, in particular:

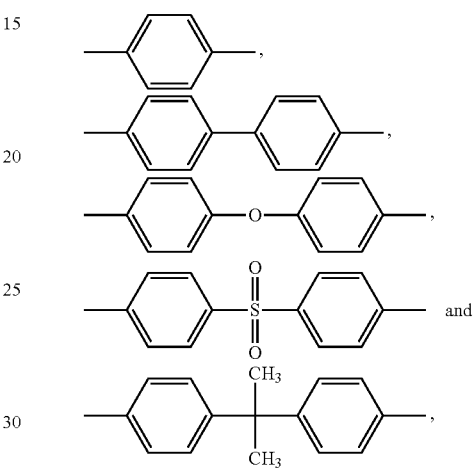

in a weight amount, based on the total weight of the recurring units of the polyarylethersulfone, that exceeds 50%. Very often, the weight amount of recurring units (R1), based on the total weight of the recurring units of the polyarylethersulfone, exceeds 90%. Often, the polyarylethersulfone comprises recurring units (R1) as sole recurring units, i.e. the polyarylethersulfone is a homopolymer.

Polyarylethersulfones of high industrial importance useful for the present invention include:
polysulfones, also named bisphenol A polysulfones, i.e. homopolymers the recurring units of which are recurring units (R2):

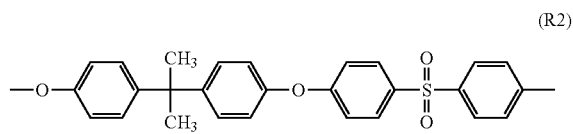

(R2)

polyethersulfones, i.e. homopolymers the recurring units of which are recurring units (R3):

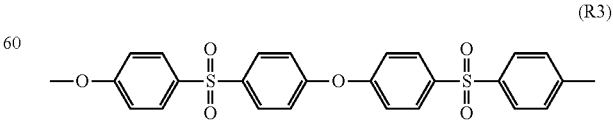

(R3)

and
polyphenylsulfones, i.e. homopolymers the recurring units of which are recurring units (R4):

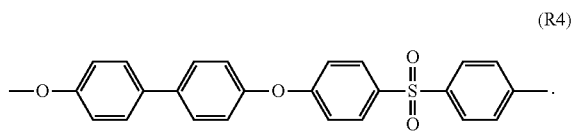
(R4)

Polysulfones (PSU), polyethersulfones (PESU) and polyphenylsulfones (PPSU) are available from Solvay Specialty Polymers USA, L.L.C. respectively as UDEL® PSU, VERADEL® PESU and RADEL® PPSU.

In one embodiment, the polymer composition of the process of the invention comprises a mixture of at least two thermoplastic polymers.

In another embodiment, the polymer composition of the process of the invention comprises a mixture of at least two thermoplastic polymers that are miscible.

In another embodiment, the polymer composition of the process of the invention comprises a mixture of at least two thermoplastic polymers that are immiscible.

In another embodiment, the polymer composition of the process of the invention comprises a mixture of at least two thermoplastic polymers that are partially miscible.

In another embodiment, the polymer composition of the process of the invention comprises a mixture of at least one semi-crystalline and at least one amorphous polymer.

In another embodiment, the polymer composition of the process of the invention comprises a mixture of at least two semi-crystalline polymers.

In another embodiment, the polymer composition of the process of the invention comprises a mixture of at least two amorphous polymers.

In another embodiment, the polymers contained in said mixtures of at least one semi-crystalline and at least one amorphous polymer, of at least two semi-crystalline polymers, or at least two amorphous polymers are miscible, immiscible or partially miscible.

In another embodiment, the polymer composition of the process of the invention comprises a mixture comprising at least one polymer having a glass transition temperature of from 5° C. to 80° C., and at least one polymer having a glass transition temperature of from 81° C. to 250° C.

In a further embodiment, the polymer composition comprises a mixture comprising at least one polymer having a melt viscosity of from 1 to 50 Pa·s and at least one polymer having a melt viscosity of from 75 to 350 Pa·s.

Melt viscosity (η) of semi-crystalline or amorphous thermoplastic polymer according to the invention can be measured using a plane-planar rheometer (e.g. an ARES type instrument from Rheometrics Scientific) with a diameter of 50 mm, using a stepwise shear sweep ranging from 1 to 100 $s^{-1}$, pursuant to ISO 11403-2. The polymer is in the form of a film with a thickness of 150 μm, of granules or of powder. The polymer, if semi-crystalline, is brought to a temperature of 25 to 30° C. above its melting temperature, and the measurement is then carried out. The polymer, if amorphous, is brought to a temperature of from 50° C. to 250° C., more preferably 100 to 150° C., above its glass transition temperature, such that its degradation temperature is not exceeded, and the measurement is then carried out. The thermoplastic polymer composition according to the invention at the viscosity measurement conditions exhibits a melt viscosity η of from 5 to 200 Pa·s, preferably from 10 to 125 Pa·s, still preferably from 15 to 100 Pa·s, most preferably from 20 to 80 Pa·s. Optimally, semi-crystalline or amorphous thermoplastic polymer according to the invention maintain their viscosity, i.e. their molecular weight, during the manufacturing process of the invention. Viscosity variation during the manufacturing process of the invention preferably amounts to less than ±20%, still preferably less than ±15%, based on the original viscosity of the polymer composition.

Following the definition of "melt" provided in the Cambridge Dictionary ("to turn from something solid into something soft or liquid, or to cause something to do this"), the term "melt" of amorphous thermoplastic polymer or semi-crystalline thermoplastic polymer within the scope of the present invention is intended to encompass an amorphous thermoplastic polymer above its glass transition temperature or a semi-crystalline thermoplastic polymer above its melting temperature.

Melting temperature, temperature of crystallization, and glass transition temperature of polymers and polymer compositions according to the present invention is meant to be melting temperature, temperature of crystallization, and glass transition temperature as measured by Differential Scanning Calorimetry (DSC) employing a heating or cooling rate of 10 K/minute (see e.g. "Thermal Analysis of Polymers", Handbook Mettler Toledo). The glass transition is observed as a step in the heat flow. Glass transition temperature as per the present invention means the midpoint temperature of said step in the heat flow. The melting or crystallization transitions are observed as a peak in the heat flow. Melting or crystallization temperature as per the present invention means the temperature at the tip of the melting/crystallization peak. A Q2000 DSC instrument from TA Instruments was used to determine melting/crystallization temperatures and glass transition temperatures according to the present invention.

As disclosed herein above, polymer compositions comprising mixtures of thermoplastic polymers may be employed in the process of the present invention. Said mixtures may comprise thermoplastic polymers that are miscible, immiscible or partially miscible. Miscibility, within the scope of the present invention, shall denote miscibility as determined by Differential Scanning Calorimetry (DSC). If the employed polymers are completely miscible only one glass transition ($T_g$), and, if applicable, melting/crystallization transition ($T_m/T_c$), is observed, usually somewhere in between the $T_g$'s, if applicable $T_m/T_c$'s, of the single components. If the employed polymers are only partially miscible or immiscible, there may be two or more $T_g$'s, if applicable $T_m/T_c$'s, visible in the DSC scan.

The term polymer composition as used herein refers to a composition comprising at least one thermoplastic polymer. The polymer composition and/or the composite article according to the invention may also comprise all the additives normally used in polymer-based compositions used for the manufacture of articles. Thus, examples of additives include heat stabilizers, UV stabilizers, antioxidants, lubricants, pigments, dyes, plasticizers, crystallization modifiers, reinforcing fillers, flame retardants and impact modifiers.

The polymer composition according to the invention exhibits from 50 to 100% by volume, preferably from 20 to 65% by volume, more preferably from 25 to 60% by volume of thermoplastic polymer, with respect to the total volume of the polymer composition.

Additives to improve the quality of the polymer reinforcement material can also be used. These additives may for example be incorporated into the polymer composition, incorporated into the yarns and/or fibers of the reinforcement material, present on the yarns and/or fibers of said material, or else deposited on the reinforcement material.

These additives may be coupling agents such as those of aminosilane, glycidosilane or chlorosilane type in the case of glass, of maleic anhydride, polyvinylpyrrolidone or epoxy type in the case of carbon, or fluidifying or wetting agents, or their combination.

Reinforcing fillers, in particular so-called "fine" fillers, may be incorporated into the polymer composition. These fillers may be chosen from fibrous fillers, such as short glass fibers, for example, or non-fibrous fillers such as graphite, kaolin, talc, silica, mica or wollastonite. Their size is generally between 0.05 and 50 µm, preferably between 0.05 and 25 µm, more preferably between 0.05 and 20 µm, more preferably between 0.05 and 5 µm. Sub-micron or even nanometric size fillers may also be used, alone or in addition to other fillers.

The present invention also relates to an article obtainable by the method of the invention. The article may in particular be a polyamide-based or a polyphenylene sulfide (PPS) based composite article comprising a reinforcing fabric, in which the polyamide has a melt viscosity η of between 10 and 100 Pa·s, preferably between 15 and 80 Pa·s, more preferably between 30 and 75 Pa·s, and the PPS has a melt viscosity q of between 10 and 300 Pa·s, preferably between 30 and 200 Pa·s, more preferably between 50 and 100 Pa·s.

The articles according to the invention preferably comprise between 20 and 65% by volume of reinforcement material relative to the total volume, more preferably between 25 and 60%.

The production cycle of composite article by compression resin transfer molding according to the invention comprises the introduction of at least one reinforcement material in a generally preheated mold, partial closing of the mold, a temperature rise step of the mold above the point of polymer melting or polymer glass transition, an optional temperature maintenance step, a step of injection of polymer, closing the mold to the final thickness of the part effecting complete impregnation of the reinforcement material, a cooling step and finally a step of recovering the composite article. The flow of the polymer may be either parallel or perpendicular to the plane of the reinforcement material.

In a first step (a), a reinforcement material is placed in a preheated mold, or molding chamber. The mold or molding chamber is preheated to a temperature $T_1$ that is in the range of from 50° C., preferably of from 75° C., to a temperature $T_1^{max}$, wherein $T_1^{max}$ is defined as follows:

$$T_1^{max} = T_g^{max} + 40° \text{C.},\qquad\text{(i)}$$

if the polymer composition has no melting transition, or if the polymer composition has at least one melting transition and the highest melting temperature $T_m^{max}$ of the polymer composition is lower than $T_g^{max} + 40°$ C., wherein $T_g^{max}$ denotes the highest glass transition temperature of the polymer composition, or $$T_1^{max} = T_m^{max},\qquad\text{(ii)}$$

if the polymer composition has at least one melting transition and the highest melting temperature $T_m^{max}$ of the polymer composition is equal or greater than $T_g^{max} + 40°$ C.

$T_m^{max}$ shall mean, as determined by DSC at a heating rate of 10 K/minute, the highest observable melting transition temperature of a polymer composition comprising at least one semi-crystalline polymer.

$T_g^{max}$ shall mean, as determined by DSC at a heating rate of 10 K/minute, the highest observable glass transition temperature of a polymer composition comprising at least one amorphous polymer.

One or more reinforcement materials can be put in the same mold. Several molds can be used at the same time. Preferably, the reinforcement material is placed in the preheated mold to obtain the temperature adequate for the following process steps of the invention. Alternatively, the reinforcement material may be placed in the unheated mold, and heating to the required temperature conducted thereafter. It is also possible to place metal or composite inserts in the mold at the same time as the reinforcement material. The mold is brought and maintained at the desired temperature by various known means, such as, for example, Joule effect heating through resistors or heating cartridges, the circulation of heat transfer fluid, or the high-frequency magnetic induction. This part of the process is also known in resin transfer molding (RTM) of thermoset materials, which consists in injecting resin into a closed mold in which reinforcing fibers have previously been placed. Step (a) is generally carried out under low pressure, or even at zero pressure.

In a second step (b), the mold is partially closed, such that the mold exhibits an open gap having a volume corresponding to 70% to 200% of the to be injected polymer volume. In other words, the partial closure of the mold is conducted such that the space between the reinforcement material (e.g. a fibrous preform) and the mold surface is in the range of from 0.1 to 7.5 mm, preferably from 0.5 to 3 mm.

Temperature rise step (c) of the mold may be conducted in a time period ranging from 1 minute to 30 minutes, preferably from 1 minute to 5 minutes. Advantageously, step (c) is carried out as quickly as possible. The final temperature $T_2$ preferentially is in the range of from $T_2^{min}$ to $T_2^{max}$, wherein $T_2^{min}$ and $T_2^{max}$ are defined as follows:

$$T_2^{min} = T_g^{max} + 50° \text{C.},\ T_2^{max} = T_g^{max} + 300° \text{C.},\qquad\text{(i)}$$

if the polymer composition has no melting transition, or $$T_2^{min} = T_g^{max} + 50° \text{C.},\ T_2^{max} = T_g^{max} + 150° \text{C.},\qquad\text{(ii)}$$

if the polymer composition has at least one melting transition and the highest melting temperature $T_m^{max}$ of the polymer composition is lower than $T_g^{max} + 40°$ C., or $$T_2^{min} = T_m^{max} + 10° \text{C.},\ T_2^{max} = T_m^{max} + 100° \text{C.},\qquad\text{(iii)}$$

if the polymer composition has at least one melting transition and the highest melting temperature $T_m^{max}$ of the polymer composition is equal or greater than $T_g^{max} + 40°$ C. The final temperature is selected such to not exceed the thermal decomposition temperature (TDT) of the polymer composition or the TDT of components thereof. Thermal decomposition temperature, for the purposes of the present invention, shall mean the extrapolated onset temperature of a TGA (thermogravimetric analysis) thermal curve employing a heating rate of 20° C./min and a nitrogen purge of 25 ml/min (ISO 11358).

The temperature of the mold is optionally maintained (step (d)) for a duration of from 10 seconds to several minutes.

Injection of the polymer composition (step (e)) is conducted in a time period dependent upon the article geometry and mold setup. The polymer composition typically has a melt viscosity of from 5 to 200 Pa·s, determined at the temperature of step (c) and a shear rate of 100 s$^{-1}$ Typical injection periods range from 10 seconds to 2 minutes, preferably 15 seconds to 1 minute. Injection is conducted at one time via a single injection point or employing multiple shots via multiple injection points. Resin flow must be controlled and adapted to pressure applied in the process and further process conditions. Typical resin flow rates and pressures are low, typically ranging from 0.5 to 20 cm³/s (preferably 2.5 to 15 cm³/s) and 0.05 to 0.5 MPa (preferably below 0.2 MPa), respectively. Step (e) serves for transferring resin into the mold and commencement of impregnating the reinforcement material. A vacuum may be applied to the mold to facilitate the removal of trapped gases, such as air, and thus avoid porosity of parts.

Gradual and controlled mold closure (step (f)) completes the impregnation of the reinforcement material. Rate of mold closure ranges from 0.001 to 0.5 mm/s, with 0.005 to 0.05 mm/s being preferred. Mold pressure resulting under the processing conditions typically ranges from 0.2 to 17.5 MPa, preferably 0.5 to 10 MPa. Control of the pressure rate is important to achieve fast impregnation of the reinforcement material without deformation thereof. Preferably, in the initial compression stage of step (f), pressure rises to less than 1 MPa. In the final stage of compression, mold pressure is permitted to rise to typically 1-10 MPa. Mold closure is then stopped and cooling is started.

Management of crystallization of semi-crystalline polymer, if present, in the polymer composition in step (g) is critical upon cooling in order to confer a structuring of polymer chains and effect good composite part performance. Therefore, if applicable, cooling prior to release of the part from the mold is conducted to a temperature $T_3$ wherein $T_3$ is in a range having as the upper limit a temperature exceeding the lowest temperature of crystallization ($T_c^{min}$) by no more than 25° C., and as the lower limit a temperature falling below the lowest temperature of crystallization of the polymer composition by no more than 120° C. Rapid cooling at typical rates of from 50° C. to 150° C./min is required. These are higher cooling rates than those traditionally used in injection molding. $T_c^{min}$ of a polymer composition, as determined by DSC at a cooling rate of 10 K/minute is referred to as the lowest observable temperature of crystallization of a polymer composition.

In the absence of a crystallization transition, same cooling rates as defined above are applied. Cooling is to be effected to a temperature $T_3$ wherein $T_3$ is in a range having as the upper limit a temperature exceeding the lowest glass transition temperature ($T_g^{min}$) of the polymer composition by no more than 50° C., and as the lower limit a temperature falling below the lowest glass transition temperature ($T_g^{min}$) of the polymer composition by no more than 100° C. $T_g^{min}$ of a polymer composition, as determined by DSC at a heating rate of 10 K/minute is referred to as the lowest observable glass transition temperature of a polymer composition.

Thus, preferably, in step (g) cooling the mold is effected to a temperature $T_3$ that is in the range of from $T_3^{min}$ to $T_3^{max}$, wherein $T_3^{min}$ and $T_3^{max}$ are defined as follows:

$$T_3^{min}=T_g^{min}-100° C., T_3^{max}=T_g^{min}+50° C., \quad (i)$$

if the polymer composition has no crystallization transition, and wherein $T_g^{min}$ denotes the lowest glass transition temperature of the polymer composition; or $$T_3^{min}=T_c^{min}-120° C., T_3^{max}=T_c^{min}+25° C., \quad (ii)$$

if the polymer composition has at least one crystallization transition, and wherein $T_c^{min}$ denotes the lowest crystallization temperature of the polymer composition.

In certain embodiments of a polymer composition having no crystallization transition $T_3^{max}=T_g^{min}$. In preferred embodiments of a polymer composition having no crystallization transition $T_3^{min}=T_g^{min}-50° C.$ In certain embodiments of a polymer composition having at least one crystallization transition $T_3^{max}=T_c^{min}$. In a preferred embodiment of a polymer composition having at least one crystallization transition $T_3^{min}=T_c^{min}-60° C.$ In further embodiments, cooling may advantageously be effected applying a ramp suitable to optimize crystallization of semi-crystalline polymer, if present, and to improve the properties of the article.

Cooling step (g) is preferentially effected in a time period of from 1 minute to 20 minutes, most preferably of from 1 minute to 5 minutes.

Final processing step (h) is conducted using procedures familiar to a person skilled in the art.

In another embodiment, the release of the part from the mold is immediately followed by a further production cycle, beginning with step (a), i.e. placement of a reinforcement material into the preheated mold. To reduce cycle time, temperature $T_3$ employed in step (g) is advantageously chosen equal or at least very close to temperature $T_1$ employed in step (a).

The manufacturing process of the present invention consisting of the impregnation of dry reinforcement (preform) material with a melt thermoplastic polymer composition for the manufacturing of composite parts may be conducted employing an injection molding press (electric, or hybrid) equipped with a high-temperature mold which can operate at a temperature that is the higher of either a temperature exceeding the highest melting temperature ($T_m^{max}$) or, the highest glass transition temperature ($T_g^{max}$) of the polymer composition.

Process conditions were developed, in particular concerning the melt injection step, employing low polymer flow (typically of from 2 to 15 cm³/s), low pressure (lower than 0.25 MPa) and precise control of mold closure at typical pressure rates of from about 0.001 to 0.075 MPa/s. Advantageously, low viscosity polymer compositions are used in combination with high permeability fibrous preforms adapted to the process and to the conditions of impregnation. The technological breakthrough so obtained provides cycle times in the production of composite parts of typically a few minutes. Thus, the present invention proposes an economically competitive industrial alternative of making composite parts employing a standard injection press that is modified with specific technical options.

Beyond the injection molding press and the high-temperature mold, the apparatus to conduct the process of the invention comprises a heating/cooling system allowing control of the thermal profile and heating/cooling rate of the mold.

Injection molding press: The press employed in the process of the present invention was developed from a standard injection molding press. The press is automated and equipped with a specific control that is adapted to the requirements of the process. The press has closed-loop control with respect to temperature and pressure feedback from the mold or feedback from the heating/cooling system. The hot runner used to inject melt polymer into the mold as well as the shutter valves are managed by the press. The press is capable of processing polymer compositions having a melt viscosity, as determined by ISO 11403-2 at 100 s⁻¹, of from 1 to 250 Pa·s at operating temperatures exceeding 400° C.

High temperature mold: The mold consists two heated blocks of steel: A mobile block, and a fixed block and is capable of operating at temperatures exceeding 400° C. The central part (molding cavity) is isolated from the mold frame by a high-performance insulating material. Heating may be effected by conventional technologies, such as, for example, heating cartridges inserted into the mass including several heating zones. Cooling of the two blocks is effected by a circulating air/water mixture. Each block is divided into several independent heating zones permitting to tune the thermal profile inside the molding cavity. Several thermocouples are used for the temperature regulation of blocks, as well as for measuring the actual temperature of the molding cavity. The temperature difference between the two heated blocks must be controlled before closure of the mold is authorized. To limit steel deformation stress due to thermal expansion and to avoid mold deformation, the molding cavity is designed such to permit expansion in both lateral directions. Cooling is effected via a circulation of an air/water mixture in the mold as closely as possible to the molding cavity surface. Polymer melt inlet at the injection point can be controlled via a hot runner and a specific valve gate compatible with the fluid material. Several sensors can be incorporated into the mold, such as pressure sensors, and temperature sensors.

Heating/cooling system and regulation: Heating is effected via power control and regulation of the heating elements inserted into the mold. Cooling is advantageously effected by circulation of a air/water mixture, in a closed circuit, from a water tank equipped with a plate heat exchanger. The system is designed such to permit heating the mold at a rate of from 50 to 75° C./minute, and cooling the mold at a rate of up to 150° C./minute. The temperature difference between the blocks of the mold must be strictly controlled. All feedback data from the mold (pressure and temperature from mold cavity, temperature from regulation thermocouples) are used to refine the control of the process, i.e. control of the press, the heating/cooling steps, controlled mold closure, and mold opening for ejection of the article.

Additional layers of shape and structure may be added to composite parts manufactured by the process of the present invention. This may, for example, be achieved by placing the hot composite article as recovered in step (h) hereinabove into a second mold and subsequently, at least partially, overmolding, via injection molding, the surface of the composite article with a second polymer composition. It is important that, during the overmolding, the temperature difference between the injected second polymer composition and the composite article is lower than 175° C., preferably lower than 150° C., and more preferably lower than 125° C.

Overmolded composite articles may be subjected to further overmolding by placing them into third and consecutive molds and overmolding them with further polymer compositions.

To enhance adhesion of overmolded layers to the [if applicable overmolded] composite article, the polymer composition used for overmolding preferably comprises a polymer having the same polymer backbone as the one used for the production of the composite article. Further, the polymer composition used for overmolding has a melt viscosity, determined as specified herein above, in the range of from 150 to 5,000 Pa·s, preferably between 150 and 2,500 Pa·s. Further, the polymer composition used for overmolding may comprise fillers, such as short fibers and/or elastomeric nodules.

The obtained composite articles have excellent mechanical properties and can be manufactured in attractive cycle times of less than 5 minutes, and without requiring any other pre or post molding consolidation treatment. The articles further exhibit excellent impregnation of the reinforcement material which provides them good stiffness and tensile strength, good impact resistance, and good fatigue behavior.

All this can be achieved at relatively low injection pressures of typically less than 0.50 MPa, preferably less than 0.25 MPa, and employing thermoplastic polymers having a melt viscosity of greater than 30 to 75 Pa·s. The process of the invention by the use of low pressure tooling and employing short cycle times makes it possible to provide composite articles having the advantage of reduced manufacturing costs, and the manufacture of parts of relatively complex shapes.

EXAMPLES

A) Polymers

Figure 1:
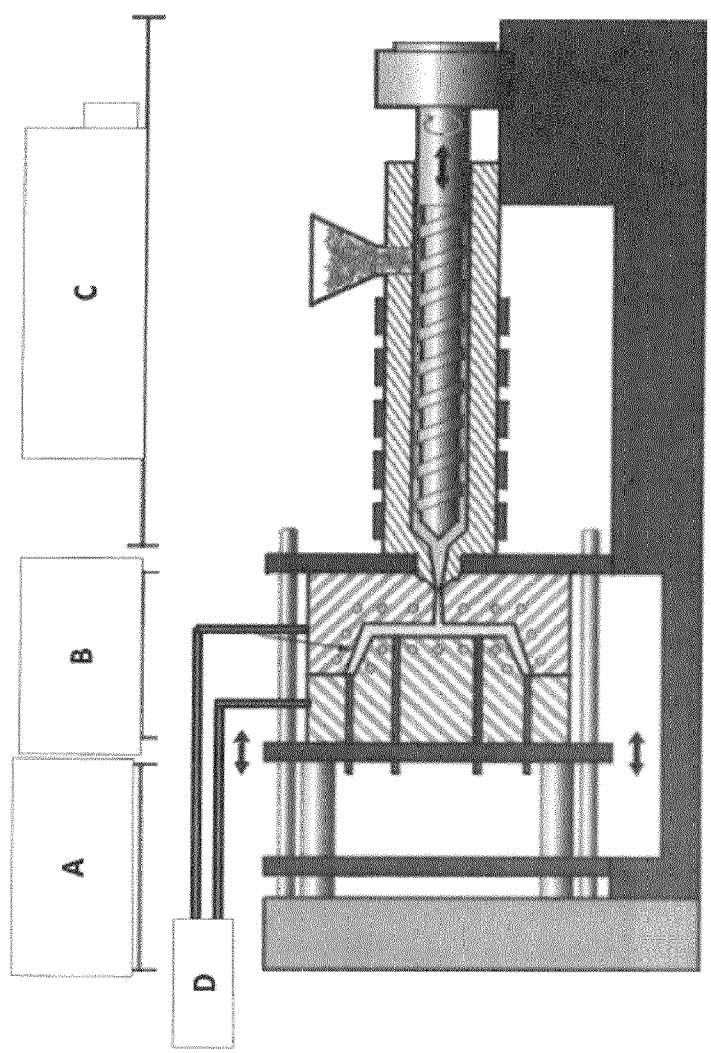
FIG. 1: Typical process unit. C: injection press, including plastification and injection unit; B: high temperature mold; A: mold closure unit; D: heating/cooling system.
Figure 2:
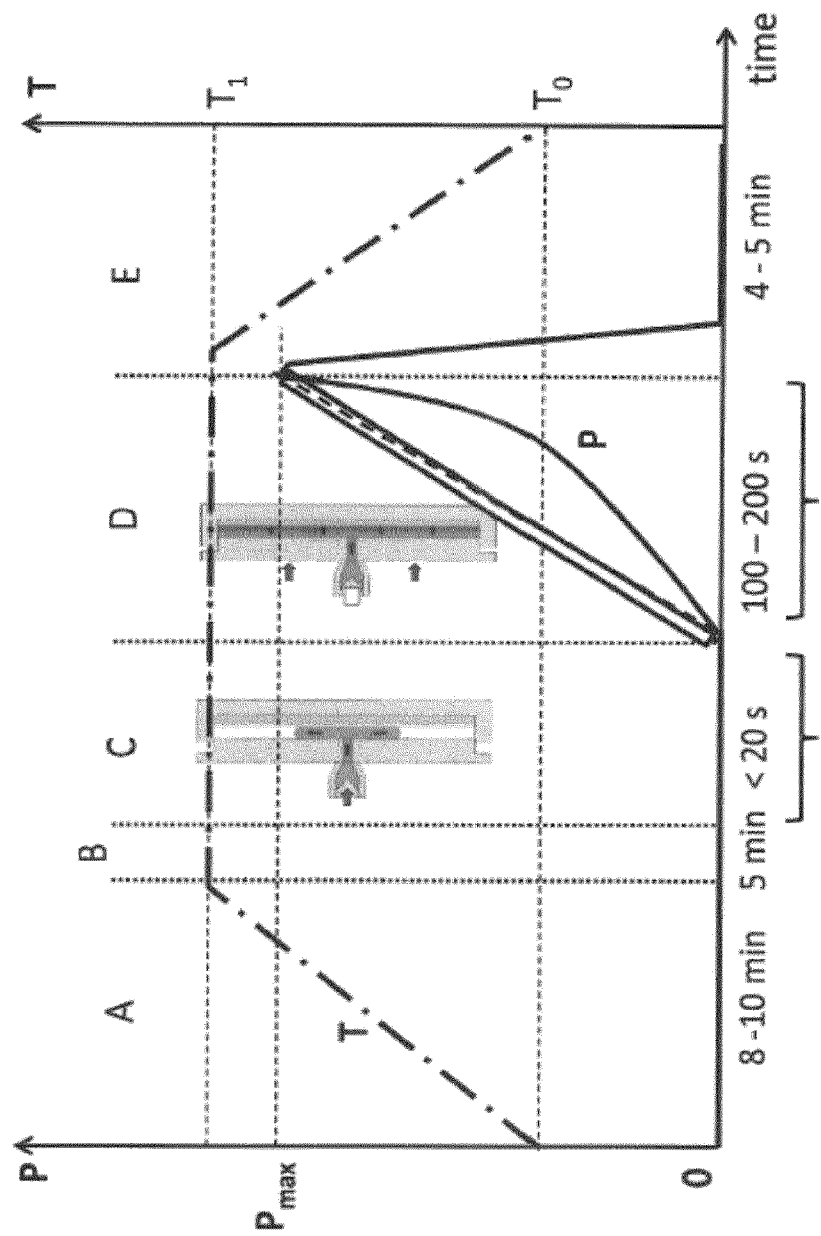
FIG. 2: Typical process cycle. P: Pressure; T: Temperature; $P_{max}$: maximum pressure; $T_0$: introduction temperature (steps (a), (b) of claim 1); A: heating step (c) of claim 1; $T_1$: maximum temperature; B: temperature maintenance step (d) of claim 1; C: injection step (e) of claim 1; D: compression step (f) of claim 1; E: cooling step (g) of claim 1.
Figure 3:
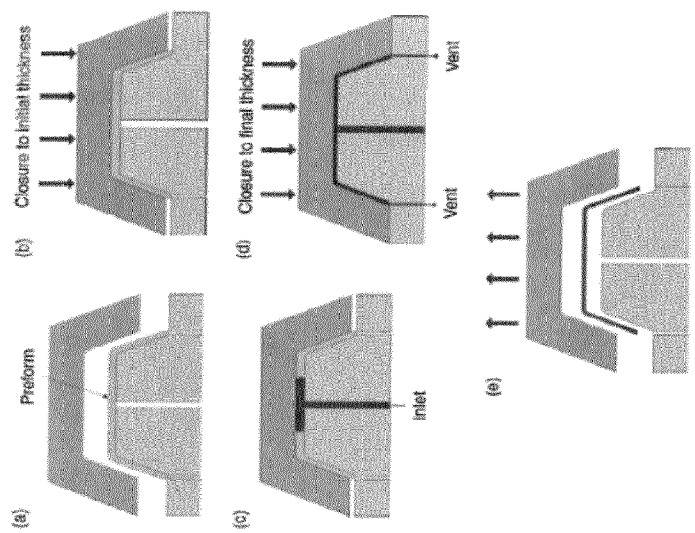
FIG. 3: Scetch of high temperature mold along process cycle. A: injection of polymer composition; B: mold closure (compression); (a): introduction of preform; (b): closure to initial thickness; (c): injection; (d): closure to final thickness and venting; (e): mold opening.
Figure 3:

A-1: Aliphatic polyamide (PA 6): Evolite® XS1480 (Solvay)

A-2: Aliphatic polyamide (PA 66): Evolite® XA1481 (Solvay)

A-3: Aliphatic polyamide (PA 66): Technyl® 22FE1 (Solvay)

A-4: Polyphenylene sulfide (PPS): Ryton® QA200N (Solvay)

A-5: Polyphenylene sulfide blend (PPS): Ryton® QA321N (Solvay)

A-6: Polyphenylene sulfide blend (PPS): Ryton® QA200N/Ryton® QA321N (50/50; w/w) (Solvay)

A-7: Compound based on aliphatic polyamide (PA 6): Technyl® C246 SIV30 (Solvay)

A-8: Compound based on Polyphenylene sulfide (PPS): Ryton® R-4-240 (Solvay)

Melt viscosities (η) of polymer compositions (ISO 11403-2, at 100 s$^{-1}$):

A-1: 15 Pa·s at T=300° C.; 30 Pa·s at T=285° C.
A-2: 50 Pa·s at T=275° C.
A-3: 75 Pa·s at T=275° C.
A-4: 290-300 Pa·s at T=300° C.; 75-80 Pa·s at T=350° C.
A-5: 25-30 Pa·s at T=300° C.; 15-18 Pa·s at T=350° C.
A-6: 50 Pa·s at T=325° C.
A-7: 2,000-2,500 Pa·s at T=270° C.
A-8: 2,250-2,500 Pa·s at T=300° C.

B) Reinforcement Materials

B-1: Plain-weave glass fabric (600 g/m$^2$): G-Weave 600P AC 80 (Chromarat)

B-2: Twill-weave glass fabric 2×2 (650 g/m$^2$): G-Weave 650T/PA (Chromarat)

B-3: Twill-weave carbon fiber fabric (650 g/m$^2$); C-Weave 650T 12K HS (Chromarat)

C) Procedure

Device used for tests according to the invention: injection press, high temperature mold, heating/cooling system.

1) Injection molding press: electric press, closing force: 125 tons (Select H470-125T from Billion (France)). Plasticizing unit: 40 mm diameter, having an L/D of 23.5 and capable of operating at up to 400° C. Adapted valve and hot runner with controlled shaft/valve. Control of cycle by automation. A specially developed software was used.

2) High-temperature mold (400° C.), developed by G. Pernoud (France). Molding cavity of 190×270 mm, with an adjustable depth of from 2.5 mm to 5 mm. Avoidance of leaks is assured by a 0.02 mm controlled functional clearance between the fixed and the mobile block independently of the temperature. Heating is conducted by electric cartridges (40 kW) capable of operating at a temperature of up to 400° C. Cooling is conducted by circulation of an air/water mixture. Instrumentation: thermocouples (16), and pressure sensors (6).

3) Heating/cooling with regulation from Pinette Emidecau Industries (France). Heating by electric cartridges (36). Regulation of 8 zones (4 in mobile block of mold/4 in fixed block of mold) Heating rate: 50° C./min. Cooling by circulation of air/water mixture in the mold. Cooling rate: 100 to 150° C./min. Supervision/control by automation and retrieval of parameters from the different temperature and pressure sensors.

Communication between the press automation and the heating/cooling system automation.

Mold closure is displacement controlled at 0.01 mm. Plates of sizes 190×270×2.5 mm or 190×270×e (with e of from 2 to 5 mm) were made. Injection flow sequence is programmed as to a defined profile, typically 2-10-6-4 cm³/s. All parts are completely boxed for good insulation and thermal regulation. Temperature ramps are employed in step (c) of the process of 25 to 50° C./minute. For cooling, a temperature ramp of 50 to 150° C./minute is employed in step (g) of the process.

Procedure A

Reinforcement material is placed in the preheated (125° C.) mold which is then partially closed and heated to a temperature of about 300° C. in a few minutes (step (c)). Mold cavity temperature is maintained at 280° C. for 1.5 minutes (step (d)). The polymer composition is injected at 290° C. (step (e)) and a pressure of <0.1 MPa employing a rate of from 2 to 10 cm³/second to fill the free cavity. Injection is stopped, and the mold is gradually closed (step (f)) employing a pressure rate of from 0.005 to 0.030 MPa·s⁻¹ until the desired final part thickness has been reached. Cooling is started. Mold temperature is permitted to drop to about 125° C. The mold is opened and the composite article ejected.

Procedure B

In a variant of Procedures A and C, and to reduce cycle time, the temperature maintenance step (step (d)) is omitted, and gradual closure of the mold (step (f)) conducted already during (step (e)), i.e. the injection of the polymer composition.

Procedure C

Reinforcement material is placed in the preheated (150° C.) mold which is then partially closed and heated to a temperature of about 290° C. in a few minutes (step (c)). Mold cavity temperature is maintained at 270° C. for 1.5 minutes (step (d)). The polymer composition is injected at 280° C. (step (e)) and a pressure of <0.1 MPa with a rate of from 2 to 10 cm³/second to fill the free cavity. Injection is stopped, and the mold is gradually closed (step (f)) employing a pressure rate of from 0.0025 to 0.035 MPa·s⁻¹ until the desired final part thickness has been reached. Cooling is started. Mold temperature is permitted to drop to about 150° C. The mold is opened and the composite article ejected.

Procedure D

Reinforcement material is placed in the preheated (150° C.) mold which is then partially closed and heated to a temperature of about 350° C. in a few minutes (step (c)). Mold cavity temperature is maintained at 325° C. for 1.5 minutes (step (d)). The polymer composition is injected at 335° C. (step (e)) and a pressure of <0.1 MPa with a rate of from 2 to 10 cm³/second to fill the free cavity. Injection is stopped, and the mold is gradually closed (step (f)) employing a pressure rate of from 0.003 to 0.05 MPa·s⁻¹ until the desired final part thickness has been reached. Cooling is started. Mold temperature is permitted to drop to about 150° C. The mold is opened and the composite article ejected.

Procedure E (Comparative Procedure)

The procedure of Procedure A was employed with the exception that mold temperature was set to 200° C. (i.e. below the melting temperature of the molding composition, as disclosed in US 2013/0001817 A1).

Example 1

Polymer: A-1; Reinforcement: B-2 (5 plies)

Example 2

Polymer: A-1; Reinforcement: B-2 (6 plies)

Example 3

Polymer: A-2; Reinforcement: B-2 (6 plies)

Example 4

Polymer: A-6; Reinforcement: B-2 (5 plies)

Comparative Example (Employing Procedure E)

Polymer: A-1; Reinforcement: B-2 (6 plies); fiber content: 50% by volume

TABLE 1

| Results (Procedures A (Ex. 1 & 2) and C (Ex. 3) | | | | | |
|---|---|---|---|---|---|
| | Ex. 1 | Ex. 2 | Ex. 3 | Ex. 4 | Comp. Ex. |
| Density (g/cm³) | 1.6 | 1.87 | 1.85 | | |
| Fiber content (% by volume) | 43 | 50 | 50 | | 50 (target) |
| Tensile Strength (MPa) | 390 | 495 | 425 | | 0 |
| Flexural Strength (MPa) | 280 | 480 | 310 | | |
| Tensile Modulus (GPa) | 21.5 | 22 | 23 | | |

TABLE 1-continued

Results (Procedures A (Ex. 1 & 2) and C (Ex. 3))

|  | Ex. 1 | Ex. 2 | Ex. 3 | Ex. 4 | Comp. Ex. |
|---|---|---|---|---|---|
| Microstructure | good (no visible porosity) | very good | very good |  | no impregnation |

TABLE 2

Results (Procedure B)

|  | Ex. 1 | Ex. 2 | Ex. 3 | Ex. 4 |
|---|---|---|---|---|
| Density (g/cm³) | 1.6 | 1.87 | 1.85 |  |
| Fiber content (% by volume) | 43 | 50 | 50 |  |
| Tensile Strength (MPa) | 395 | 490 | 430 |  |
| Tensile Modulus (GPa) | 22 | 21.5 | 23.5 |  |
| Flexural Strength (MPa) | 275 | 482 | 315 |  |

Example 5: Overmolding (Procedure F)

Composite articles as made by any of Procedures A-D are used as is for overmolding, or such articles that have previously been overmolded with polymer coat of a thickness of from 0.2 to 2.5 millimeters) according to this Procedure F.

Overmolded composite articles as per the present invention were made by injection molding the overmolding resin composition (Polymer A-7) in a thickness of about 1 to 1.5 mm onto composite articles (thickness 1.75 mm: 4 plies) by the procedure as described below:

190×270×1.75 mm composite plates made by Procedure A from Polymer A-1 were placed into a mold cavity as inserts and were over injection molded with Polymer A-7 using an injection molding machine (Select H470-125T Dixit3 (from Billion, France)) having a maximum locking force of 1,250 kN. A high temperature mold (from G. Pernoud, France) was used, capable to operate at temperatures exceeding 400° C. The mold was electrically heated to a temperature of from 100° C. to 180° C. Before the over injection molding step, the composite articles had been preheated to 100° C. for 15 minutes or came from step (h) of the process of the present invention at a temperature falling below $T_c^{min}$ or $T_g^{min}$. The injection molding machine was set at a melt injection temperature of 270° C. Pressure of the mold was set to less than 10.0 MPa for about 1 minute, followed by 20.0 MPa for about 1 to 3 additional minutes and subsequently cooled to below 125° C.

Bond strength. Overmolded composite articles made by Procedure F were cut into 1.25 cm wide by 6.5 cm long test specimens using a diamond blade and water cooling. A four point method by supporting the beam on the tensile side (outer span) of the specimens was used to characterize adhesion/bond strength of the overmolded resin composition to the composite structure.

The tests were conducted at 2.0 mm/min using a universal test machine (Instron).

Beam specimens (12.5 mm×65 mm) were machined from overmolded composite plates. The overmolded layers of the beams were notched prior to testing by using a low speed diamond saw to cut through approximately 95% of the depth of the overmolded layer. A fresh razor blade was used to sharpen the prenotch by sliding it across the prenotch. The notched side of the specimens was placed on the outer span supports and the laminate was loaded. The resulting load-displacement curves exhibit a peak, then drop sharply, and finally exhibit a plateau which corresponds to the adhesion level.

Table 3 lists results obtained from overmolding specimens.

TABLE 3

Results of overmolding tests

|  | O 1 | O 2 | O 3 | O 4 |
|---|---|---|---|---|
| Mold temperature T (° C.) | 80 | 120 | 140 | 160 |
| Matrix resin | PA6 | PA6 | PA6 | PA6 |
| Overmolding resin (260° C.) | PA6 | PA6 | PA6 | PA6 |
| Bond Strength (N) |  |  |  | 70 |

As shown in Table 3, the adhesion between an overmold of thermoplastic polymer composition and a composite article is a function of the temperature difference between melt temperature and composite insert temperature.

The invention claimed is:

1. A process for manufacturing a composite article by injection molding a polymer composition comprising at least one semi-crystalline thermoplastic polymer and/or at least one amorphous thermoplastic polymer, comprising the following steps:

(a) Introducing at least one reinforcement material into a preheated mold having a temperature $T_1$ that is in the range of from 50° C. to a temperature $T_1^{max}$, wherein $T_1^{max}$ is defined as follows:

$$T_1^{max} = T_g^{max} + 40° C., \quad (i)$$

if the polymer composition has no melting transition, or if the polymer composition has at least one melting transition and the highest melting temperature $T_m^{max}$ of the polymer composition is lower than $T_g^{max} + 40°$ C., wherein $T_g^{max}$ denotes the highest glass transition temperature of the polymer composition, or $$T_1^{max} = T_m^{max}, \quad (ii)$$

if the polymer composition has at least one melting transition and the highest melting temperature $T_m^{max}$ of the polymer composition is equal or greater than $T_g^{max} + 40°$ C.; and (b) after the introducing, partially closing the mold including the at least one reinforcement material, such that the mold exhibits an open gap with a volume of from 70% to 200% of the polymer volume to be injected; and (c) after the partial closing, raising the temperature of the mold to a temperature $T_2$ that is in the range of from $T_2^{min}$ to $T_2^{max}$, wherein $T_2^{min}$ and $T_2^{max}$ are defined as follows:

$$T_2^{min} = T_g^{max} + 50° C., \quad T_2^{max} = T_g^{max} + 300° C., \quad (i)$$

if the polymer composition has no melting transition, or $$T_2^{min} = T_g^{max} + 50° C., \quad T_2^{max} = T_g^{max} + 150° C., \quad (ii)$$

if the polymer composition has at least one melting transition and the highest melting temperature $T_m^{max}$ of the polymer composition is lower than $T_g^{max}+40°$ C.,
or $$T_g^{min}=T_m^{max}+10° \text{ C.}, \; T_2^{max}=T_m^{max}+100° \text{ C.}, \quad \text{(iii)}$$

if the polymer composition has at least one melting transition and the highest melting temperature $T_m^{max}$ of the polymer composition is equal or greater than $T_g^{max}+40°$ C.; and (d) optionally maintaining the raised temperature of the mold for a period of time; and (e) after the raising the temperature and the optional maintaining, injecting a polymer composition having a melt viscosity of from 5 to 200 Pa·s, determined according to ISO 11403-2 at the temperature of step (c) and a shear rate of 100 s−1, into the mold, filling the free cavity obtained by partial closure of the mold; and (f) after the injecting, closing the mold to the final thickness of the part, maintaining the temperature of step (c), employing a compression rate of from 0.001 to 0.5 mm/s and permitting the mold pressure to rise to a range of from 0.2 to 17.5 MPa; and (g) after the mold pressure rises, cooling the mold to a temperature $T_3$ that is in the range of from $T_3^{min}$ to $T_3^{max}$, wherein $T_3^{min}$ and $T_3^{max}$ are defined as follows:

$$T_3^{min}=T_g^{min}-100° \text{ C.}, \; T_3^{max}=T_g^{min}+50° \text{ C.}, \quad \text{(i)}$$

if the polymer composition has no crystallization transition, and wherein $T_g^{min}$ denotes the lowest glass transition temperature of the polymer composition,
or $$T_3^{min}=T_c^{min}-120° \text{ C.}, \; T_3^{max}=T_c^{min}+25° \text{ C.}, \quad \text{(ii)}$$

if the polymer composition has at least one crystallization transition, and wherein $T_c^{min}$ denotes the lowest crystallization temperature of the polymer composition; and (h) after the cooling, opening the mold, ejecting and recovering the produced composite article.

2. The process of claim 1, wherein the preheated mold has a temperature in the range of from 75° C. to $T_1^{max}$.

3. The process of claim 1, wherein the reinforcement material is heated before introduction into the mold.

4. The process of claim 1, wherein temperature raising step (c) is carried out in a period of from 1 minute to 30 minutes.

5. The process of claim 1, wherein injection step (e) is carried out in a period of from 10 seconds to 2 minutes.

6. The process of claim 1, wherein the composite article comprises from 20% to 65% by volume, of reinforcing material, based on the total volume of the composite article.

7. The process of claim 1, wherein the variation of viscosity of the polymer composition amounts to less than ±20%.

8. The process of claim 1, wherein the semi-crystalline polymer comprises a fully aliphatic polyamide or a partially aromatic polyamide or mixtures thereof.

9. The process of claim 1, wherein the semi-crystalline polymer comprises a polyphenylene sulphide or a mixture of two or more polyphenylene sulfides.

10. The process of claim 1, wherein the polymer composition comprises at least one polyamide and at least one polyphenylene sulphide.

11. The process of claim 1, wherein the amorphous thermoplastic polymer is at least one from the group consisting of: polyacrylate, polystyrene, polycarbonate, polyurethane, polydimethylphenylene ether, polyarylether sulfone, polyetherimide, and polyamideimide.

12. The process of claim 1, wherein the polymer composition comprises a mixture comprising at least one semi-crystalline and at least one amorphous polymer.

13. The process of claim 1, wherein the polymer composition comprises a mixture comprising at least one polymer having a glass transition temperature of from 5° C. to 80° C., and at least one polymer having a glass transition temperature of from 81° C. to 250° C.

14. The process of claim 1, wherein the polymer composition comprises a mixture comprising at least one polymer having a melt viscosity of from 1 to 50 Pas and at least one polymer having a melt viscosity of from 75 to 350 Pa·s.

15. The process of claim 1, wherein the polymer composition exhibits a melt viscosity η of from 10 to 125 Pa·s.

16. The process of claim 1, further comprising: placing the composite article as recovered in step (h) into a second mold and subsequently at least partially overmolding, via injection molding, the surface of the composite article with a second polymer composition wherein, during the overmolding, the temperature difference between the injected second polymer composition and the composite article is lower than 175° C.

17. The process of claim 1, wherein in step (f) the mold pressure is permitted to rise to a range of from 0.5 to 10 MPa.

18. The process of claim 16, wherein the temperature difference between the injected second polymer composition and the composite article is lower than 150° C.

19. The process of claim 16, wherein the temperature difference between the injected second polymer composition and the composite article is lower than 125° C.

* * * * *